United States Patent [19]
Adams

[11] Patent Number: 4,690,447
[45] Date of Patent: Sep. 1, 1987

[54] RAISED GRIP SHOVEL

[76] Inventor: Michael Adams, 3954 Dundee Rd., Northbrook, Ill. 60062

[21] Appl. No.: 941,534

[22] Filed: Dec. 10, 1986

Related U.S. Application Data

[63] Continuation of Ser. No. 748,503, Jun. 25, 1985, abandoned.

[51] Int. Cl.⁴ .............................................. B25G 1/10
[52] U.S. Cl. ........................................ 294/57; 294/58
[58] Field of Search .................... 294/49, 54.5, 57, 58, 294/59; 16/110 R; 254/131.5

[56] References Cited

U.S. PATENT DOCUMENTS

| D. 118,156 | 12/1939 | Canfield | 294/57 UX |
|---|---|---|---|
| 845,592 | 2/1907 | Stewart | 294/57 |
| 875,504 | 12/1907 | Clark | 294/58 |
| 2,318,277 | 5/1943 | Yensen | 294/58 X |
| 3,078,604 | 2/1963 | Neuman | 294/57 X |
| 3,136,574 | 6/1964 | Pasquale | 294/58 X |
| 3,436,111 | 4/1969 | England | 294/57 X |
| 4,264,096 | 4/1981 | Barnett | 294/58 |

FOREIGN PATENT DOCUMENTS

| 52045 | 8/1936 | Denmark | 294/58 |
|---|---|---|---|
| 31276 | 10/1920 | Norway | 294/58 |
| 73559 | 5/1948 | Norway | 294/59 |

Primary Examiner—Johnny D. Cherry
Attorney, Agent, or Firm—Hill, Van Santen, Steadman & Simpson

[57] ABSTRACT

A raised grip shovel has the handlebar with the back grip at one end and a front grip being raised to a level of the back grip during a shovel operation. Such elevation of the front grip can be achieved by curvilinear shape of the handlebar or by various support elements. A front grip position can be adjusted in accordance with a person's particular height, arm length and physical conditions. The angular and spacial relocation of the front grip straightens the posture and increases the digging thrust. The change of the posture alleviates the back stress by shifting the load to the legs and lower back muscles which are significantly stronger than muscles of the upper body.

1 Claim, 7 Drawing Figures

RAISED GRIP SHOVEL

This is a continuation of application Ser. No. 748,503 filed June 25, 1985, now abandoned.

BACKGROUND OF THE INVENTION

1. Field of the Invention

This invention pertains to excavating mechanisms, and more particularly to hand held shovels.

2. Information Disclosure Statement

The hand held shovels used in the past usually have a back grip at one end of the handle which may be located transversely to the handlebar and a front grip which is essentially a portion of the handlebar located near the point of attachment of a scoop to the handlebar. Some shovels have a slightly curved handlebar. However, in all conventional shovels the front grip area is essentially in-line with the back grip and the joint between the handlebar and the scoop. Such spacial correlation between the described parts requires considerable forward bending of a person operating a shovel. People with various back ailments experience great difficulty in moving, excavating and lifting the material deposited on a shovel scoop.

The below-described invention alleviates the back stress by relocating and adjustably securing the front grip of a shovel as described in detail hereinbelow.

SUMMARY OF THE INVENTION

According to the present invention, a shovel has a handlebar with a back grip at one end thereof. The shovel comprises a scoop attached to the handlebar at the joint located at another end thereof and support means for locating a front grip part substantially above the joint and approximately at a level of the back grip during an operation of said shovel.

DESCRIPTION OF THE PREFERRED EMBODIMENT

The invention may be carried into practice in a number of ways but five specific embodiments will be described by way of example only.

Figure 1:
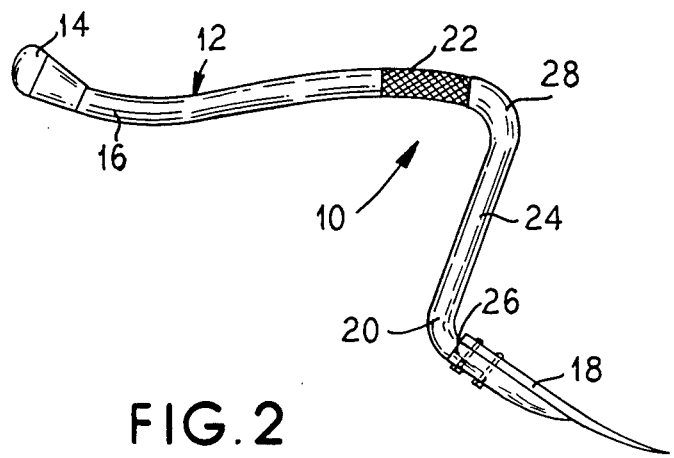
FIG. 1 is a side view of a raised grip shovel in its first embodiment.

Referring now to the drawings wherein the reference characters designate like or corresponding parts throughout the several views, there is shown in FIG. 1 a shovel 10 which has a handlebar 12. The handlebar 12 includes a D-shaped back grip 14 at one end 16 and conventional scoop 18 being attached to another or front end 20 thereof. A front grip 22 is disposed on an arcuate support bracket 24 connecting the handlebar ends 16 and 20. The attachment of the scoop 18 to the handlebar end 16 at a joint 26 can be accomplished in any conventional manner. The front grip 22 is located substantially at a level of the back grip 14 during elevational and rectilinear movement of the shovel. Such location of the shovel grips radically changes the posture of a person excavating, moving and lifting material off of the ground. The straightening of the upper body is particularly helpful in straight forward movement of the shovel frequently used in removing snow off the ground. The arcuate bracket 24 is tilted in such a way so as to place the front grip 22 as close as possible to the joint 26 and bracket apex on corner 28 while remaining in the same substantially horizontal plane as the back grip 14 during the shovel operation. The handlebar 12 has almost a Z-shaped configuration with the joint 26 being "tucked in" under the grip 22.

Figure 2:
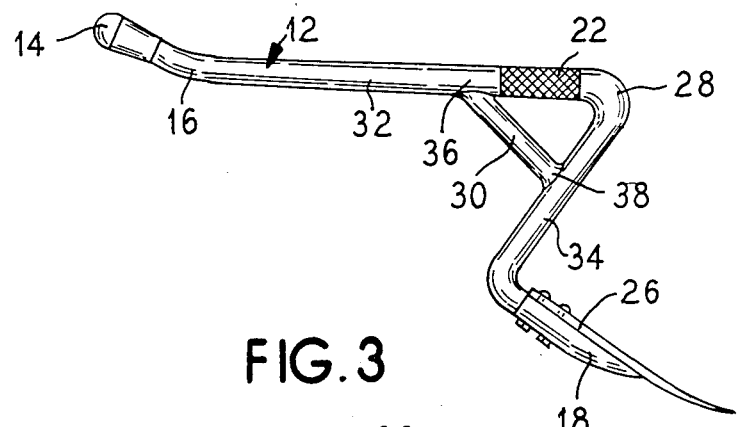
FIG. 2 is a side view thereof in its second embodiment.

The A-shaped handlebar 12 illustrated in FIG. 2 includes a brace 30 attached to both legs 32 and 34 of the arcuate bracket 24 at junctures 36 and 38, respectively. The brace of cross brace 30 is substantially spaced apart from the back grip 14 and the joint 26. The front grip 22 is located between the brace juncture 36 and the handlebar apex 28. The front grip is also positioned substantially vertically above the joint 20. The front grip 22 and back grip 14 are located approximately at one level at the time of excavation, elevation and linear displacement of the shovel. Handlebars for both shovel embodiments can be made of wood, light metal or plastic material. The arcuate or curved handlebar greatly reduces the back stress and efforts in lifting and front displacement of the matter by positioning the material load under the front grip.

Figure 3:
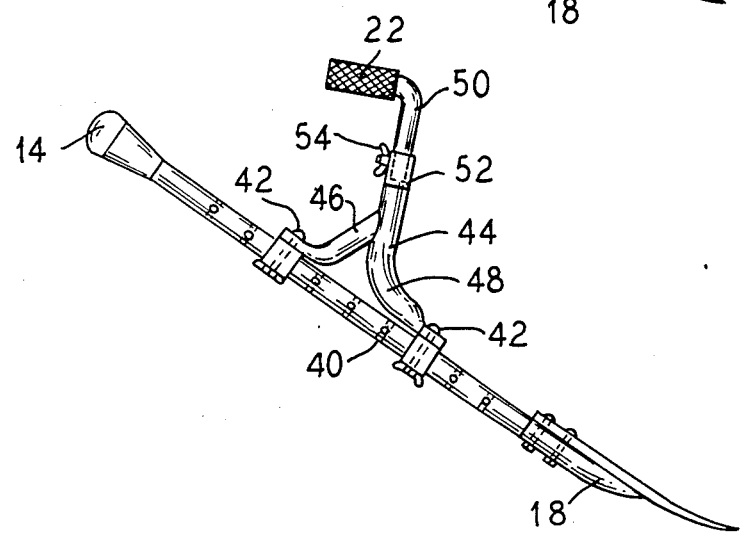
FIG. 3 is a side view thereof in its third embpdiment.

The shovel shown in FIG. 3 has a substantially straight handlebar 12 which is perforated by the openings 40 fittingly receiving bolts 42 in order to secure the support bracket 44 to the handlebar 12. The bracket 44 has a configuration of an inverted "Y". The bracket legs 46 and 48 can be secured to the handlebar 12 by bolts, clamps or other suitable mechanical means. The front grip 22 is located on an elbow 50 slideably rotatable about and moveable into the tubular bracket 44. The elbow 50 is secured to the bracket 44 by virtue of the collar 52 with the wing screw 54 passing therethrough. Such attachment of the elbow 50 permits telescoping of the front grip 22 in and out of the bracket 44 and 360° rotation thereabout. In addition, the bracket 44 can be adjustably attached to the handlebar 12 in predetermined locations and under selected angles correlated to perforations or notches 40 on the handlebar 12. The tubing of the handlebar 12 and bracket 44 can be made of a light metal, or the like material.

Figure 4:
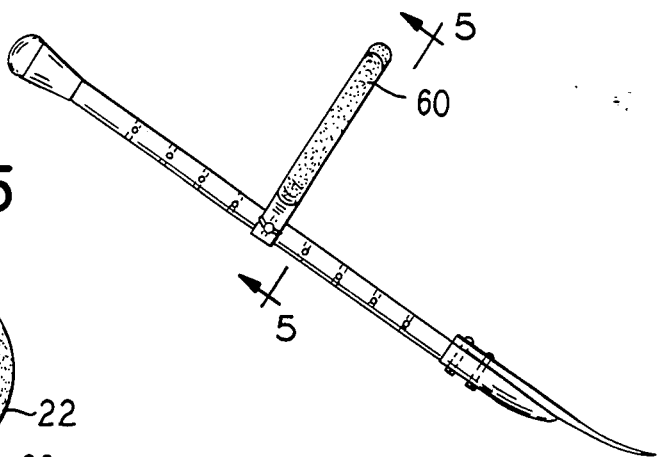
FIG. 4 is a side view thereof in its fourth embodiment.
Figure 5:
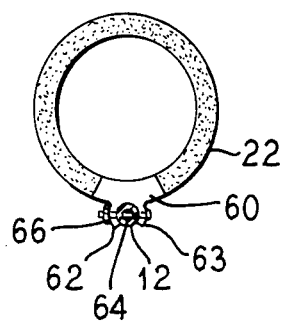
FIG. 5 is a partially cross-sectional view thereof taken substantially along the lines 5—5 in FIG. 4.

The shovel shown in FIG. 4 has the same handlebar 12 as depicted in FIG. 3 but the support bracket 60 has a ring configuration. As best shown in FIG. 5, the bracket 60 has the essentially continuous front grip 22 detachably secured to the handlebar 12 by a pair of flanges 62, 63. The bolt 64 penetrates the flanges 62, 63 and the handlebar perforation 40. The wing nut 66 of the bolt 64 facilitates a quick release and attachment of the bracket 60 to the handlebar 12.

Figure 6:
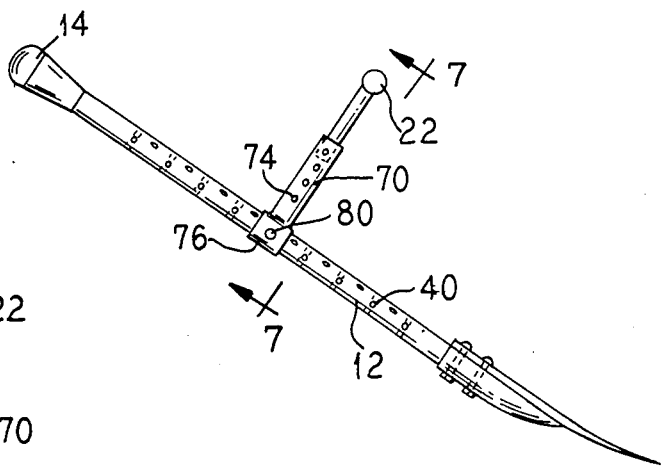
FIG. 6 is a side view thereof in its fifth embodiment.
Figure 7:
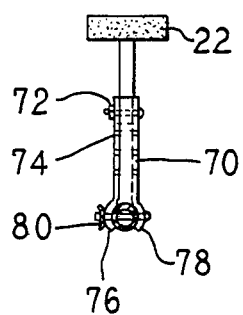
FIG. 7 is a partially cross-sectional view thereof taken substantially along the lines 7—7 in FIG. 6.

The shovel embodiment illustrated in FIGS. 6 and 7 includes the perforated handlebar 12 with the T-shaped front grip 22 slidingly and rotatably attachable to the tubular bracket 70 by the bolt and wing nut 72. The bracket 70 is perforated by the openings 74 facilitating the height adjustment of the grip 22 by receiving locking pins or bolts. The flanges 76, 78 depending from the bracket 70 grasp the handlebar 12. The bolt 80 passing through the flanges 76, 78 secures the bracket 70 to the handlebar 12.

The shovel embodiments shown in FIGS. 3-7 permit an angular and spacial adjustment of the front grip position relative to the shovel back grip.

Such versatility and adjustability of the front grip location facilitates an alleviation of stress and back strain in all people regardless of their physical condition. The rotating momentum caused by application of forces on the scoop relative to the back grip must be absorbed or counter-reacted by a stretched arm and inclined upper body of a man. The raised front grip relocates a rotating momentum load from the upper body to the lower body by straightening the posture of a shovel operator almost to an upright position. This redistribution of forces is caused by placing or "tucking in" the material load underneath the front grip. In other words, the rotating momentum caused by the forces applied to the scoop relative to the back grip is counter-reacted by the momentum having approximately the same distance between the load application and the back grip as the distance between the grips. In a conventional shovel, these distances differ because the distance or radius between the grips is shorter than the distance between the point of load application on the scoop and the back grip. The leg and lower back muscles, which are significantly stronger than the arm and shoulder muscles, have a bigger role in the distribution of forces. It is obvious that an adjustment of the front grip relative to the back grip of the handlebar facilitates and lends itself to use by people with various arm length, height and physical conditions. One of the unique advantages of the shovel shown in FIG. 3 is the ability of the bracket to be releasably attached to a conventional shovel by virtue of clamps or collars with screws, or other mechanical means. An adjustable front grip permits to increase the body weight thrust during digging, facilitates sideway or "sickle" sweeping of the material and lends the shovel to the universal use by people with various physical dimensions.

While five embodiments of the invention have been illustrated and described herein, various changes and modifications maybe made therein without departing from the spirit of the invention as defined by the scope of the appended claims.

What is claimed is:

1. A shovel comprising a substantially Z shaped handle bar and a scoop blade having a leading edge and a back edge, said scoop blade attached to said handle bar adjacent said back edge at a connection area, said handle bar having a proximal portion, an intermediate portion and a distal portion, said distal portion attached to said scoop blade, a hand grip at a proximal end of said proximal portion, said proximal portion extending from said hand grip to an angled junction to said intermediate portion, said intermediate portion being angled with respect to said proximal portion such that when said proximal portion is substantially horizontal said intermediate portion extends backwardly under said proximal portion, said intermediate portion terminating in said distal portion, said distal portion located under said proximal portion and projecting forwardly of a junction with the intermediate portion, a hand grip area associated with sid proximal portion adjacent the junction between said proximal portion and said intermediate portion, the angle of the junction of the intermediate portion to the proximal portion being great enough whereby a hand may grip said proximal portion at the hand grip area adjacent to the junction to the intermediate portion with clearance for the hand between an under surface of the proximal portion and an upper surface of the intermediate portion underlying the proximal portion, said scoop blade projecting from said intermediate portion at an angle such that when said proximal portion is horizontal, said blade projects from said intermediate portion forwardly of the intermediate portion and downwardly from the horizontal, said hand grip area substantially overlying the connection area between the distal portion and the blade.

* * * * *